No. 825,521. PATENTED JULY 10, 1906.
S. J. DAVIS.
FRICTION CLUTCH MECHANISM.
APPLICATION FILED JULY 6, 1905.
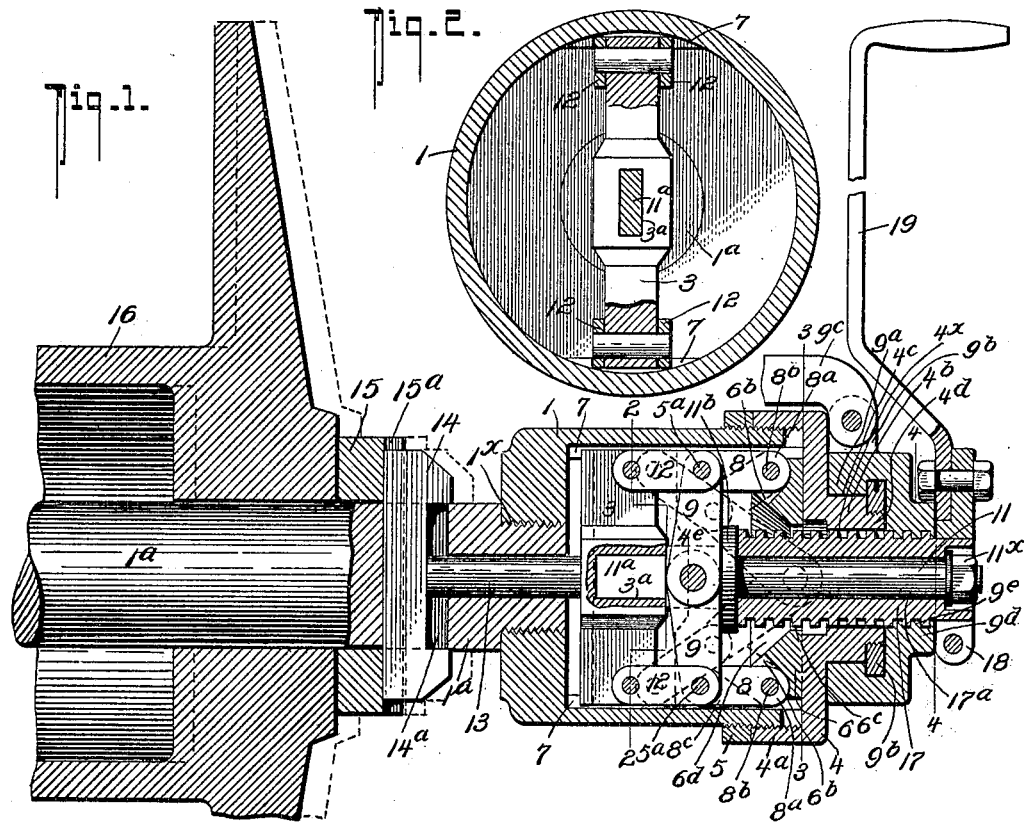
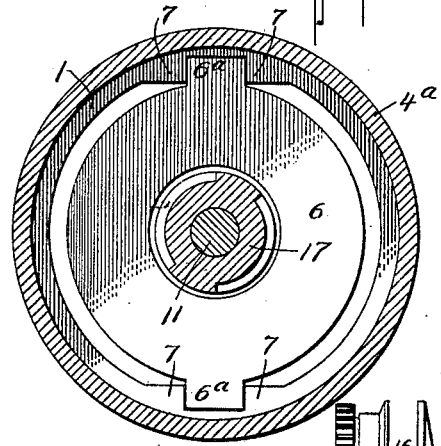
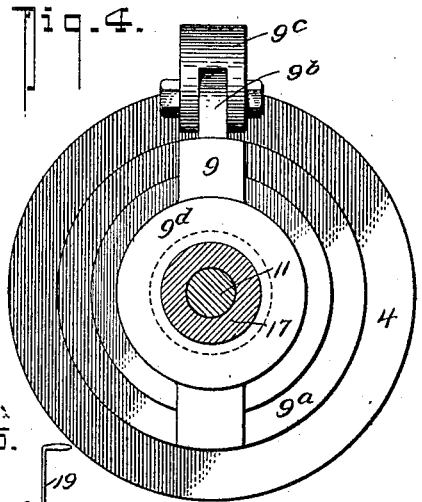
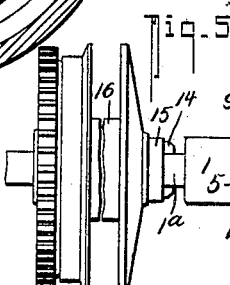
WITNESSES:
F. C. Gibson.
John T. Schrott.
INVENTOR
Spurgeon J. Davis.
BY
Fred G. Dieterich
ATTORNEYS.

UNITED STATES PATENT OFFICE.

SPURGEON J. DAVIS, OF CASTLEROCK, WASHINGTON.

FRICTION CLUTCH MECHANISM.

No. 825,521.  Specification of Letters Patent.  Patented July 10, 1906.

Application filed July 6, 1905. Serial No. 268,420.

*To all whom it may concern:*

Be it known that I, SPURGEON J. DAVIS, residing at Castlerock, in the county of Cowlitz, State of Washington, have invented a new and Improved Friction Clutch Mechanism, of which the following is a specification.

This invention relates to improvements in that type of friction clutch mechanisms for hoisting, logging, or other engines in which is included a clutch member mounted on the power-shaft to rotate therewith, toggle clutch devices mounted on the shaft and movable therewith, a shifting clutch member adapted to be locked to its shifted position by the toggle clutch devices that coöperate with the clutch member rotatable with the drive-shaft; and my invention seeks to provide a clutch mechanism of this type of a simple and economical construction which can be easily manipulated to effect a quick clutch connection without danger of slipping and in which the various devices are so arranged and designed and have such operative connection that after once set the load will be positively held.

My invention in its generic nature comprises a cylindrical hub mounted on the drum-shaft to rotate therewith, a plunger or piston longitudinally mounted in the drum-shaft which carries a clutch member for causing the drum-spool clutch to engage with the clutch-carrying gear upon the drive-shaft whereby to lock the said drum-spool and the drive-shaft to rotate together, toggle devices mounted upon the plunger or piston, a screw carried by the cylinder for moving the toggle devices into a locked engagement with the cylinder to lock the plunger or pistons and to lock the clutch members of the drive-gear and the drum-spool to rotate with the cylinder and the shaft, and means located externally of the shaft-rotated cylinder for turning said screw to cause the same to operate the toggle devices.

Again, my invention seeks to provide certain improvements on the clutch mechanism disclosed in my Patent No. 754,644, dated March 15, 1904.

In its more subordinate features my invention consists in certain details of construction and peculiar combination of parts, all of which will be first fully described and then specifically pointed out in the appended claims, reference being had to the accompanying drawnigs, in which—

Figure 1 is a vertical longitudinal section of my clutch mechanism, the clutch-spool being shown out of an operative position in dotted lines. Fig. 2 is a cross-section on the line 2 2 of Fig. 1. Fig. 3 is a similar view on the line 3 3 of Fig. 1. Fig. 4 is another section on the line 4 4 of Fig. 1. Fig. 5 is a diagrammatic side elevation of my invention in use.

In the practical application of my invention the same includes a cylinder 1, open at one end and provided with a centrally-threaded aperture $1^\times$ at the other end, whereby to admit of its being readily screwed up onto one end of the drum-shaft $1^a$. At diametrically opposite points the cylinder 1 has a pair of internal channels or grooves at each end formed by the flanges 7, which form guideways for the endwise-adjustable cross-bar 3 and the ring or disk 6, the purposes of which will presently appear.

4 designates a cap whose annular flange $4^a$ is internally threaded to screw onto the cylinder 1, and the said cap is rigidly held to its adjusted positions on the cylinder 1 by a jam-ring 5, as shown.

6 designates a ring or disk which is of a slightly less diameter than the cylinder 1, whereby to freely slip into the open end thereof, and said ring 6 has projections $6^a$, which slide in channels formed by the flanges 7 on the cylinder 1, and the said ring 6 is held to bear against the cap 4, and it has at diametrically opposite points recesses $6^b$ at its periphery, into which project the ends $8^a$ of toggle-links 8 8, pivotally mounted on the studs $8^b$. The recesses $6^b$ are suitably shaped to accommodate the shiftable movements of the toggle-links 8 8. The disk 6 is also formed with a central aperture $6^c$, whose inner end merges with the oppositely-extended grooves or channels $6^d$, which are formed to accommodate the toggle-links 9 9 when they assume the position shown in dotted lines in Fig. 1.

The cap 4 is formed with an outwardly-projected hollow hub $4^b$, having an annular flange $4^c$, adapted to receive the ring portion $9^a$ of the skeleton frame 9, presently again referred to, and the said hub $4^b$ has a threaded boss $4^d$, with which engages a threaded keeper or ring $9^b$ on the boss $4^d$. The hub $4^b$ is centrally apertured, as at $4^\times$, and through the centrally-apertured hub projects the outer end of a piston or plunger 11, which extends into the cylinder and has its inner end $11^a$, which is flattened or made rectangular in shape, projected into a rectangular socket 3ª on the bar 3. Between the bar 3 and an annular enlargement or collar 11ᵇ and upon a cross-stud 4ᵉ, secured to the plunger, are pivotally mounted the adjacent ends of a double set of toggle-links 9 9, that straddle the flattened end of a piston 11 and the inner ends 8ᶜ of the links 8, with which they pivotally connect through the stud-pins 5ª 5ª, and the latter also join the links 8 9 with the links 12 12, that extend rearwardly and are pivotally connected with the shiftable bar 3 in a manner clearly shown in Fig. 1.

13 designates the friction stem or pin, which butts against and is movable with the bar 3 and extends into a bore in the end of the drum-shaft 1ª, and the other end of the said stem 13 engages with the cross-key 14, which is edgewise movable in the cross-hub or keyway 14ª in the drum-shaft 1ª. The said key is adapted under its outer or clutching movement to engage with the transversely-disposed sockets 15ª in the adjacent wall in the collar 15, which operates the drum-spool 16, (see Fig. 1,) whereby when the spool is pushed into a clutching engagement with the driving mechanism (not shown) the shaft, the spool, and the driving mechanism are joined to rotate together. Any suitable driving mechanism for driving the spool 16 may be used; but I prefer to use the kind shown in Fig. 1 of my patent before referred to. When the plunger 11 is released, the spool 16 becomes disengaged from the driving mechanism to allow of its being freely movable.

The ring 9ª of the skeleton member 9 is provided with a lug 9ᵇ, to which the securing-bar 9ᶜ (fastened to any part of the frame of the machine to be held stationary) is secured, so as to hold the skeleton frame 9 stationary and prevent its rotation. The skeleton frame 9 includes a hub portion 9ᵈ, internally threaded, as at 9ᵉ, through which and the hub portion 4ᵇ the screw member 17 passes. The screw member 17 has a longitudinal bore 17ª to receive the piston or plunger 11, which piston or plunger 11 is formed with a collar 11ᵇ, against which one end of the screw 17 butts. The other end of the screw 17 is countersunk to receive the securing-nut 11ˣ of the plunger 11. The outer end of the screw member 17 is also provided with a clamp-receiving portion to receive the clamp 18, to which the handle-lever 19 is securely bolted, as shown in Fig. 1. When the clutch mechanism is running, the frame 9 plays loosely on the cap, and hence effects little or no frictional resistance to the running of the machine.

From the foregoing, taken in connection with the accompanying drawings, it is thought the complete operation and construction of my invention will be readily apparent to those skilled in the art to which my invention appertains. When the lever 19 is adjusted to the position shown in Fig. 1, the key 14 is locked with the collar 15, and the latter is held in a tight frictional engagement with the drum-spool 16. To throw off the clutch mechanism, the lever is rotated to unscrew the screw 17 to bring the several toggle members to the position in dotted lines in Fig. 1, which operation then shifts the bar 3 to release the tension on the pin 13 and permits the drum-spool 16 being moved out of engagement with the driving mechanism. By joining the cap 4 to the cylinder, as shown, the wear on the friction devices can be compensated for by turning the jam-ring 5 and the cap 4 a desired distance upon the cylinder 1, and as the said cylinder 1 at all times revolves with the drum-shaft it causes little or no friction on the ends of the stem 13. All the parts rotate together. There is little or no friction on either end of the stem 13, as in ordinary drum clutch members. By closing both ends of the cylinder in the manner described and mounting the clutch-shifting devices within the said cylinder, as shown, the latter are effectively protected from dirt and dust and the operation is such that they can be easily adjusted to take up wear, as well as allow for a considerable amount of wear before requiring a renewal of any of the parts. By providing a detachable cap 4 for one end of the cylinder access can be quickly had to assemble or adjust the working members within the cylinder.

Changes in the details of construction and modifications thereof can be readily made without departing from the scope of the invention or the appended claims.

Having thus described my invention, what I claim, and desire to secure by Letters Patent, is—

1. A mechanism of the character stated, comprising in combination with the drum-shaft, a driving mechanism and a drum-spool loosely mounted upon the drum-shaft, of means for shifting the drum-spool into engagement with the driving mechanism, said means including a cylinder mounted upon the end of the drum-shaft to rotate therewith, clutch members having toggle connections with each other held within said cylinder, a plunger secured to the said toggle connections and a screw-operating means rotatably mounted on said plunger for reciprocating the plunger to cause the toggle members to operate the clutch members, substantially as shown and described.

2. The combination with a drum-shaft, a cylinder open at one end and connected thereto to rotate therewith; of a piston axially movable through the cylinder, a drive-gear mounted on the drum-shaft for coöperating with the drum-spool, means for endwise locking said drive-gear and said drum-spool, said means including an endwise-movable ring and a cross-key secured to and movable in the cross-slot in the drum-shaft and adapted to interlock with the endwise-movable ring, toggle-clutch devices mounted within and coöperating with the cylinder and joined with the piston, said toggle-clutch devices adjusted by shifting said piston, a screw detachably secured to said piston and loosely rotatable thereon, a closure-cap for said cylinder, a screw-carrying frame loosely mounted on said closure-cap, means for holding said screw-carrying frame from rotation, and means connected with the screw for turning the same.

3. The combination with a drum-shaft, a cylinder open at one end and connected thereto to rotate therewith; of a piston axially movable through the cylinder, a drive-gear mounted on the drum-shaft for coöperating with the drum-spool, means for endwise locking said drive-gear and said drum-spool, said means including an endwise-movable ring and a cross-key secured to and movable in the cross-slot in the drum-shaft and adapted to interlock with the endwise-movable ring, toggle-clutch devices mounted within and cooperating with the cylinder and joined with the piston, said toggle-clutch devices adjusted by shifting said piston, a screw detachably secured to the said piston and loosely rotable thereon, a closure-cap for said cylinder, a screw-carrying frame loosely mounted on said closure-cap, means for holding said screw-carrying frame from rotation, and means connected with the screw for turning the same, said means including a clamping member secured to the outer end of the screw and a handle-lever member detachably secured to the clamping member, substantially as shown and for the purposes described.

4. The combination in a drum-spool-shifting mechanism as described, with a drum-shaft, a drum-spool and a collar or ring loosely mounted thereon; of a cylinder open at one end and secured to the shaft to rotate therewith, means for endwise moving the drum-spool, said means being detachably located within the cylinder and adapted under said adjustment of parts to interlock and rotate with the cylinder for adjusting said internal mechanism, said endwise-moving means including a piston endwise movable in the cylinder, said piston projecting through one end of the cylinder, a screw-sleeve loosely mounted on said projecting end of the piston, a closure-cap detachably and adjustably fitted over the open end of the cylinder, a screw-carrying frame carried by the closure-cap, and means exterior of the cylinder for imparting a turn movement to the screw, substantially as shown and for the purposes specified.

5. In a clutch mechanism as described, the combination with a drive-shaft having a drive-gear secured thereon, a drum-spool and a ring loosely mounted and having endwise movement thereon, of a cylinder secured to the drum-shaft to rotate therewith and having diametrically opposite longitudinal guides at each end, a cross-bar for engaging the guides at one end, a disk having portions for engaging the guides at the other end, a piston axially movable in the cylinder and connected to said cross-bar, a stem axially projected from the cross-bar through the drum-shaft, a key carried by the drum-shaft for interlocking with the endwise-movable ring, a detachable cap for one end of the cylinder, said disk having portions for engaging the longitudinal guides at the open end of the cylinder and being adapted to engage the interior wall of the said cap, toggles 9 9 secured to the pistons, toggles 8 connecting the toggles 9 9 with the cap-engaging disk, and toggles 12 for connecting the toggles 8 9 with the cross-bar, said cap having a hub, a gear-carrying frame including a ring portion loosely mounted on said cap-hub, a locking-ring for said cap secured to the end of said cap-hub, said screw-carrying frame including a hub portion having a screw-threaded aperture, a screw having a central longitudinal bore and passing through said screw-threaded aperture of the screw-carrying-member hub, said piston having a portion for projecting through said bore of the screw, a washer and nut secured to the end of said piston for holding said screw-thread, a handle member clamped to the outer end of the screw for imparting turn movement thereto, and means exterior of the cylinder for holding said screw-carrying frame from movement, substantially as shown and for the purposes described.

SPURGEON J. DAVIS.

Witnesses:
E. S. COBLEIGH,
A. T. LEWIS.